United States Patent [19]
Newberg et al.

[11] Patent Number: 6,115,365
[45] Date of Patent: *Sep. 5, 2000

[54] METHOD AND APPARATUS FOR QUEUING AND TRANSMITTING MESSAGES

[75] Inventors: Donald G. Newberg, Hoffman Estates; Robert Biggs, Algonquin, both of Ill.

[73] Assignee: Motorola, Inc., Schaumburg, Ill.

[ * ] Notice: Under 35 U.S.C. 154(b), the term of this patent shall be extended for 03 days.

[21] Appl. No.: 09/124,945

[22] Filed: Jul. 30, 1998

[51] Int. Cl.[7] .................................. H04J 1/00; H04J 3/24; H04L 12/38; H04L 12/56
[52] U.S. Cl. .............................. 370/312; 370/412
[58] Field of Search .................................. 370/412, 428, 370/444, 468, 312, 327, 341, 447; 455/11.1

[56] References Cited

U.S. PATENT DOCUMENTS

| | | |
|---|---|---|
| 4,757,529 | 7/1988 | Glapa et al. ............................. 379/244 |
| 5,815,508 | 9/1998 | Wadzinske et al. ..................... 371/5.1 |
| 5,872,779 | 2/1999 | Vaudreuil ................................ 370/352 |
| 5,883,946 | 3/1999 | Beck et al. .............................. 379/201 |
| 5,940,390 | 8/1999 | Berl et al. ............................... 370/389 |
| 5,940,397 | 8/1999 | Gritton .................................... 370/412 |

*Primary Examiner*—Alpus H. Hsu
*Assistant Examiner*—Duc Ho
*Attorney, Agent, or Firm*—Susan L. Lukasik

[57] ABSTRACT

A message transmission queue (300) including a high priority queue (HPQ) (301) having a high priority entry point; a medium priority queue (MPQ) (303) having a medium priority entry point; and a low priority queue (LPQ) (305) having a low priority entry point. Messages in the MPQ (303) are queued after all messages in the HPQ (301). Messages in the LPQ (305) are queued after all messages in the MPQ (303). A sequencer reinserts messages into the queue (300) based on the message repeat count and the message's previous queue position.

22 Claims, 4 Drawing Sheets

METHOD AND APPARATUS FOR QUEUING AND TRANSMITTING MESSAGES

FIELD OF THE INVENTION

This invention relates to communication systems, including but not limited to sequencing and transmission of messages in trunked communication systems.

BACKGROUND OF THE INVENTION

The basic operation and structure of a land mobile communication system is well known. Land mobile communication systems typically comprise one or more communication units (e.g., vehicle-mounted or portable communication units in a land mobile system and communication unit/ telephones in a cellular system) and one or more repeaters that transceive information via radio frequency (RF) communication resources. These communication resources may be narrow band frequency modulated channels, time division multiplex slots, frequency pairs, and so forth. Land mobile communication systems may be organized as trunked communication systems, where a plurality of communication resources is allocated amongst a group of users by assigning the repeaters on a communication-by-communication basis within an RF coverage area. Typically, one or more zone controllers, or other trunked communications controllers, providing similar functionality, controls communications throughout the system by transceiving control messages with communications devices, such as site controllers or intelligent repeaters, throughout the system.

In many of today's trunked communication systems, a zone controller needs to convey information to the communication units. Communications from a zone controller are transferred to one or more communications devices at each site and then transmitted over a control channel provided between the site and the communication units. Because these messages arrive at the site asynchronously, but are transmitted over the control channel, synchronously, the messages are placed in a queue for transmission on the control channel, and messages are selected for transmission from the queue on a first in, first out basis (FIFO). Because the messages all flow through the queue in a sequential manner, messages are not selected for transmission on any other basis other than on a FIFO basis. Messages may be delayed due to heavy loading, and some messages may actually be transmitted long after their usefulness has expired (stale messages). When stale messages are transmitted, bandwidth is wasted and transmission of useful information is further delayed. Some systems will discard messages when the queue becomes long, thereby compromising message reliability, as the discarded messages tend to be message repeats that are established to improve reliability. In addition, many standards, such as IS-102 (APCO-25), may limit any changes to the air interface that could increase control channel capacity.

Accordingly, there is a need for a method of transmitting messages that provides for control channel sequencing without compromising message reliability, wasting bandwidth, or unnecessarily delaying transmission of messages.

DESCRIPTION OF A PREFERRED EMBODIMENT

Figure 1:
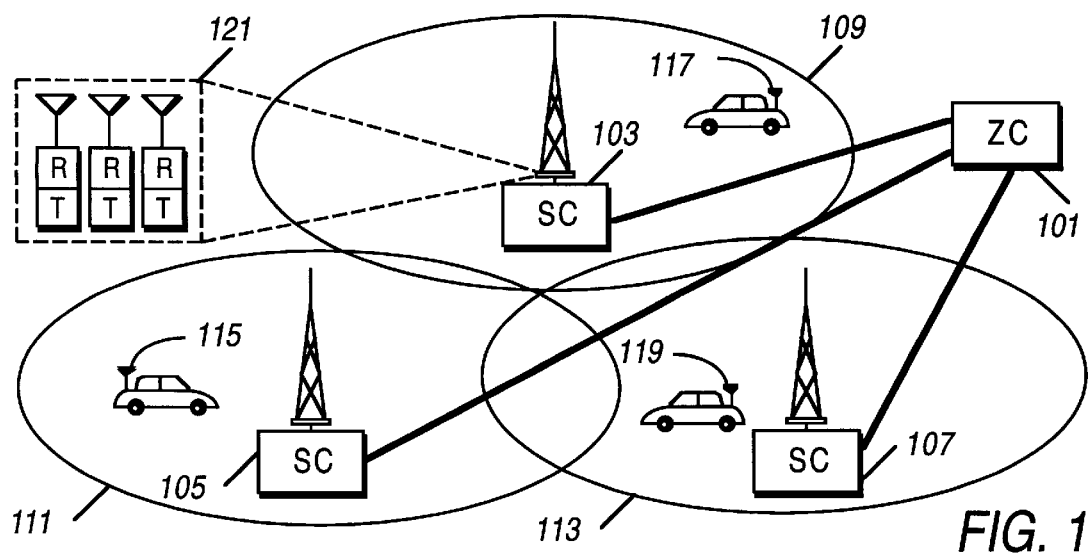
FIG. 1 is a block diagram of a trunked communication system in accordance with the invention.

The following describes an apparatus for and method of queuing (sequencing) and transmitting messages on a control channel without compromising message reliability, wasting bandwidth, or unnecessarily delaying transmission of messages. The method utilizes a queue with multiple entry points, not all of which are at the top of the queue. When messages require multiple transmissions, they may are reinserted into the queue in many different places, including positions significantly different in the queue than where the message previously resided. A message's entry point in the queue is based on its priority, and its reinsertion place is based at least in part on the previous position of the message in the queue. Messages may also be processed before reinsertion in the queue. The present invention provides for quick retransmission of the first two transmissions of short-deadline messages, because such messages need to reach their intended destination with high reliability before the deadline is reached.

A method of the present invention comprises the steps of generating, by a call processor, a message for future transmission on at least one control channel at a communication site; setting a priority based on a transmit deadline for the message; establishing a message repeat count based on a target audience for the message; and conveying the message, including the priority and the message repeat count, from the call processor to the communication site. The step of setting may further comprise the steps of when the message has a short transmit deadline, setting the priority as high; when the message has a long transmit deadline, setting the priority as low; and when the message priority was not set as high and was not set as low, setting the priority as medium. The step of establishing may further comprise the steps of when the message is targeted to more than one communication device (including subscribers, loggers, comparators), establishing the message repeat count as high; when the message is targeted to only one communication unit, establishing the message repeat count as medium; and when the message is not targeted to any communication unit, establishing the message repeat count as low.

Another method of the present invention comprises the steps of receiving a first message, including a priority and a message repeat count; placing the first message in a queue at one of at least two entry points to the queue, wherein the placing is based on the priority of the first message, and wherein each of the entry points corresponds to a different priority; selecting a second message from the top of the queue for transmission; and when the second message has not been transmitted a number of times equal to the message repeat count, reinserting the message into the queue at a place in the queue the same as or lower than the message's previous queue position. The step of reinserting the message may comprise the step of selecting an insertion point not necessarily immediately below the message's previous queue position. Each message may be transmitted in one of N slots in a frame, and the step of selecting may further comprise the step of selecting a message other than the message from the top of the queue when the message from the top of the queue is the same as a message scheduled for transmission in the same frame, wherein N is an integer greater than 1.

A message transmission queue in accordance with the present invention comprises a high priority queue (HPQ) having a high priority entry point; a medium priority queue (MPQ) having a medium priority entry point; wherein messages in the MPQ are queued after all messages in the HPQ; a low priority queue (LPQ) having a low priority entry point; wherein messages in the LPQ are queued after all messages in the MPQ; a sequencer, operably coupled to the HPQ, the MPQ, and the LPQ, arranged and constructed to reinsert messages into the queue based on the message repeat count and the message's previous queue position.

The queue may be comprised of a high priority queue (HPQ) having a high priority entry point and a medium priority queue (MPQ) having a medium priority entry point; messages in the MPQ may be queued after all messages in the HPQ; and the step of reinserting may comprise the step of, when the message's previous queue position was at the bottom of the HPQ, placing the message in the MPQ at a position below the medium priority entry point.

The queue may be comprised of a high priority queue (HPQ); wherein the HPQ comprises a first sub-queue and a second sub-queue, and wherein a message having a high priority and a message repeat count of at least two is first placed in the first sub-queue at the high priority entry point, and the message is reinserted in the second sub-queue after transmission from the first sub-queue. The queue may be comprised of a medium priority queue (MPQ); wherein the MPQ comprises a first sub-queue and a second sub-queue, and wherein a message having a medium priority and a message repeat count of at least two is placed in the first sub-queue at the medium priority entry point, and the message is reinserted in the second sub-queue after transmission from the first sub-queue.

The queue may be comprised of a high priority queue (HPQ) and a medium priority queue (MPQ) having a medium priority entry point; wherein the MPQ is comprised of an upper queue and a lower queue; wherein the medium priority entry point is in the upper queue; wherein messages in the lower queue are queued after all messages in the upper queue; wherein messages with a previous queue position in the HPQ and messages with a previous queue position in the upper queue are reinserted in the lower queue after transmission. At least some of the messages in the lower queue may be converted into message that are transmitted using less bandwidth than is used to transmit a message. The order in which messages are to be transmitted from the lower queue of the MPQ may be arbitrated.

The queue may be comprised of a medium priority queue (MPQ) having a medium priority entry point and a low priority queue (LPQ) having a low priority entry point; the LPQ may be comprised of an upper queue and a lower queue; the low priority entry point may be in the upper queue; messages in the lower queue are queued after all messages in the upper queue; messages with a previous queue position in the MPQ may be reinserted in the lower queue after transmission. The order in which messages are to be transmitted from the lower queue of the LPQ may be arbitrated.

A block diagram of a communication system in which the present invention may be implemented is shown in FIG. 1. One or more zone controllers, or other types of system controllers or call processors, 101 transmits messages between the various sites of the system to a site controller 103, 105, and 107, which may be a stand-alone box or card, such as a TETRA Site Controller, available from Motorola, Inc., or an intelligent repeater or base station 121, such as an IntelliRepeater™ base station available from Motorola, Inc., such that the messages may be transmitted via the control channel at each site 109, 111, and 113 that services the various communication units 115, 117, and 119 throughout the communication system. The site controller 103 or intelligent repeater 121 are operably coupled to one or more base stations or repeaters 121, including the one servicing the control channel, which communicate with the communication units 115, 117, and 119. The present invention involves a message prioritization scheme that is provided by the zone controller 101 in the preferred embodiment, and a queuing process that takes place at the control channel repeater and any peripherals to the control channel repeater. Call loggers (not shown) and other peripheral devices such as call billing devices and network managers may also be connected to the communication system either directly or via radio frequency connections. Although only three sites and three communication units are shown in the diagram of FIG. 1, the present invention may be applied to a large number of sites, including multiple zone systems and/or systems with multiple call processors.

Figure 2:
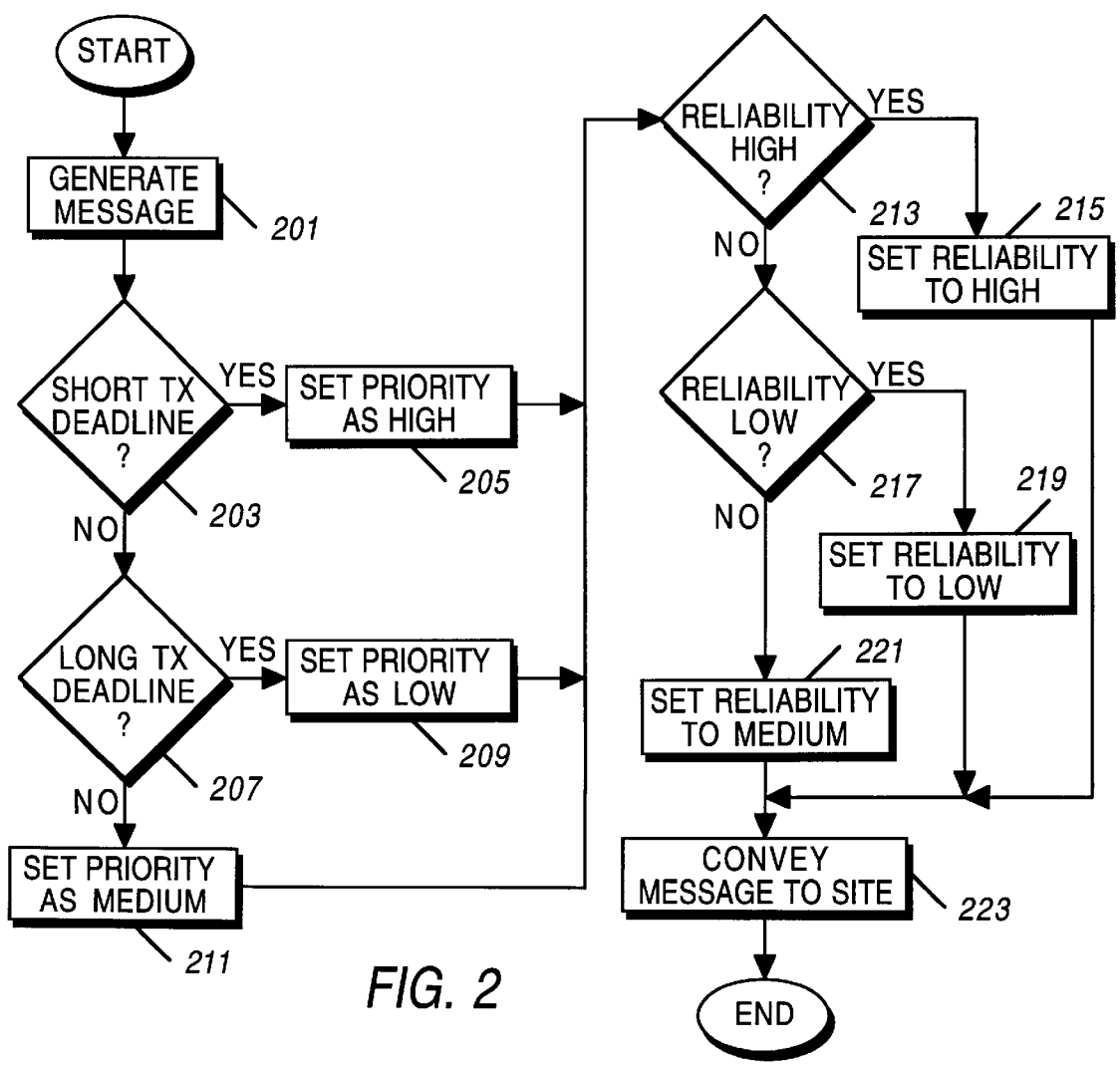
FIG. 2 is a flowchart showing a method of prioritizing messages in accordance with the invention.

A method of generating outbound control channel messages is shown in the flowchart of FIG. 2. At step 201, a message is generated for future transmission on at least one control channel at a communication site. A priority is then set for this message. At step 203, it is determined if there is a short transmit deadline for the message. For example, if this is a first response to a request, there will be a very short transmission deadline to get the message out to the requesting communication unit 115 before the requesting communication unit's 115 time-out timer induces the requesting communication unit 115 to make another request. In this case, the priority is set as high as step 205, and the process continues with step 213. If the priority does not have a short transmit deadline at step 203, the process continues with step 207, where it is determined if the message is intended for a device with a long transmit deadline. A long transmit deadline may exist, for example, when the outbound control channel message is a logging only message, such as a message intended only for a logging function. In such a case, the priority for the message is set as low at step 209, and the process continues at step 213. The length of a short transmit deadline is several hundred milliseconds, and the length of a long transmit deadline is several seconds in the preferred embodiment. Other times may be successfully used, and may be tailored to the conditions of each system. If the message does not have a long transmit deadline at step 207, the priority is then set to medium at step 211. Priority by transmit deadline allows for prioritization based on many different factors, including how time-critical the message is, the type of message (grant or acknowledgment), whether or not the message deals with an emergency, and so forth.

A reliability factor is then established for the message. In the preferred embodiment, the reliability factor is a message repeat count that is established by the zone controller or call processor for each message. The message repeat count indicates the number of times a message will be transmitted before it is taken off the queue. At step 213, it is determined if an increased reliability for the message is required. An increased reliability in the preferred embodiment includes the situation when the message is targeted to many communication devices, which communication devices include subscriber units, such as portables and mobiles, communication loggers, comparators, and so forth. Increased reliability may also take into account emergency calls or special call set-ups, such as an emergency situation that needs to keep many different users in close contact, for example, a plane crash or bombing incident. If increased reliability is required at step 213, then the reliability for the message is set to high at step 215, and in the preferred embodiment, the message repeat count is set to a high value. If increased reliability is not required, the process continues with step 217, where it is determined if low reliability is required. If low reliability is acceptable for this message, then the reliability for this message is set to low at step 219, resulting in a low message repeat count in the preferred embodiment. In the preferred embodiment, when the message is not targeted to any communication unit, for example, when the message is targeted only to a call logger, the reliability, and hence the message repeat count, may be established as a low value. When low reliability is not acceptable for the message at step 217, the reliability is set to medium at step 221, resulting in a medium message repeat count in the preferred embodiment. Medium reliability would be acceptable, for example when the message is targeted to only one communication unit. In the preferred embodiment, a high value equals three repeats, a medium value equals two repeats, and a low value equals one repeat. The process then continues with step 223, where the message is conveyed from the call processor 101 to the communication site 109 by including the priority and the message repeat count with the message.

Figure 3:
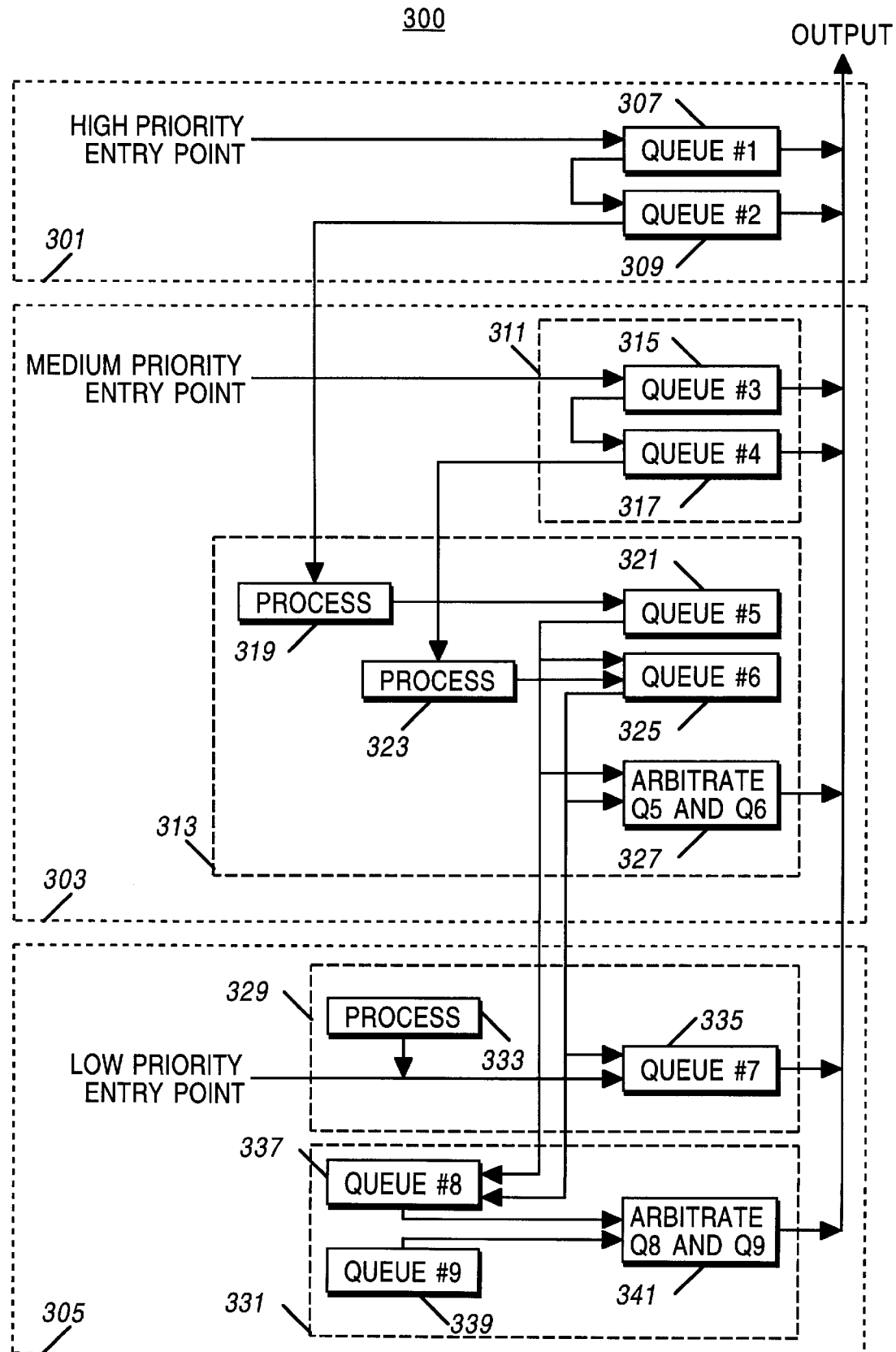
FIG. 3 is a block diagram of a queue structure in accordance with the invention.

A block diagram of a queue, or queue structure, 300 is shown in FIG. 3. In the preferred embodiment, the queue 300 is comprised of a high priority queue (HPQ) 301, a medium priority queue (MPQ) 303, and a low priority queue (LPQ) 305. Messages are initially entered into the queue into either the HPQ 301, MPQ 303, or LPQ 305 based on the priority of the message, at either the high priority entry point, medium priority entry point, or low priority entry point, respectively. Messages are reentered into the queue, based at least partially on priority, until the message has been transmitted a number of times equal to the message repeat count. The queue diagram also shows how messages are entered into the queues and forwarded between the queues (reinserted) such that the messages are sequenced for transmission on the control channel by taking into account the priority and number of repeats for each message.

In the preferred embodiment, the HPQ 301 is comprised of two sub-queues. The HPQ 301 is generally emptied quickly because it is used to transmit high priority messages as quickly as possible without burdening the remainder of the messages that need to be transmitted in the system. The high priority entry point for the HPQ 301 is in the first sub-queue 307, and all messages entering the queue 300 having a high priority are placed in queue #1 307 at the high priority entry point. If the message repeat count has not been met for a message after it is taken off of queue #1 307 and transmitted, that message then immediately goes into queue #2 309, so that high priority messages and at least the first repeat of such a message are quickly conveyed to the desired end user. Any message still requiring an additional repeat after being transmitted from queue #2 is then placed into the MPQ 303.

The MPQ 303 is comprised of an upper queue 311 and a lower queue 313. The medium priority entry point, the place in the queue where messages having a medium priority are first entered in the queue, is in the upper queue 311. The upper queue is comprised of two sub-queues 315 and 317, in a queue structure similar to that of the HPQ 301. A medium priority message is transmitted once from queue #3 315, and if repetition is required, it is placed in queue #4 317, and if further repetition is required, the message is then placed into the lower queue 313 of the MPQ 303. After all messages are transmitted from the upper queue 311 of the MPQ 303, then messages are transmitted from the lower queue 313 of the MPQ 303. In the preferred embodiment, messages may be processed upon entering the lower queue 313 before being taken off the queue for transmission.

Messages from the HPQ 301 and the upper queue 311 of the MPQ 303 enter into the lower queue 313 of the MPQ 303. In the preferred embodiment, messages from queue #2 309 are entered into the process block 319. In the preferred embodiment, process block 319 converts grants into updates. Conversion of grants into updates includes processing out certain information, for example individual identifications, such that the remaining update may be transmitted using less bandwidth than the original message. In the preferred embodiment, an update takes up half the bandwidth as a grant to transmit. Other processing that may be done in the process block 319 may include message compression, message concatenation, and message truncation, and messages other than grants may also be processed as desired. In the preferred embodiment, messages that are not grants pass through the process block 319 into queue #5 321.

Either updates or other messages from the process block 319 are placed into queue #5 321. Similarly, messages from queue #4 317 are input to a process block 323 that provides a similar function as process block 319. In the preferred embodiment, grants are converted to updates by process block 323, and the output of the process block 323 is input into queue #6 325. If any messages require further repetition after transmission from queue #5 (actually taken from queue #5 by the arbitrate block 327 for queue #5 and queue #6 for transmission), they are input into queue #6 or the LPQ 305 (queue #8 in the preferred embodiment). Similarly, after messages are transmitted from queue #6 325 (actually taken from queue #6 by the arbitrate block 327 for queue #5 and queue #6 for transmission), they are placed in the LPQ 305 (queue #7 or queue #8 in the preferred embodiment). The arbitrate block 327 for queue #5 and queue #6 determines which messages should next be taken off of the lower queue 313 and sent forth for transmission as the output of the lower queue 313. Thus, the lower queue 313 of the MPQ 303 has only one output point in the preferred embodiment, although multiple output points may also be successfully implemented.

The LPQ 305 is comprised of an upper queue 329 and a lower queue 331. The low priority entry point, the place in the queue where messages having a low priority are first entered in the queue, is in the upper queue 329. In the preferred embodiment, the upper queue 329 is comprised of a process block 333 that periodically generates status messages, such as adjacent site information, network status, radio frequency subsystem status, and site ID (identification), at the low priority entry point. The low priority entry point messages enter into queue #7 335 and are output for transmission when there are no messages for transmission waiting in queue #1 through queue #6, inclusive. If a message still requires repetition after queue #7 335, it is placed back in queue #7 335. The lower queue 331 of the LPQ 305 includes queue #8 337 and queue #9 331, whose messages are arbitrated by arbitrator 341 to determine what output from the lower queue 331 is provided as the queue output from the lower queue 331 of the LPQ 305. The inputs of queue #8 in the preferred embodiment come from queue #5 321 and queue #6 325 after those messages are transmitted from those queues. In the preferred embodiment, grants go from queue #5 321 to queue #8 337, and all other messages go to queue #6 325. In the preferred embodiment, queue #8 337 typically includes ongoing grants, whereas queue #9 339 includes continuous status messages, such as adjacent site status broadcast, network status, radio frequency subsystem status, and site ID. The arbitrate block 341 in the preferred embodiment arbitrates between sending status and update messages.

Figure 4:
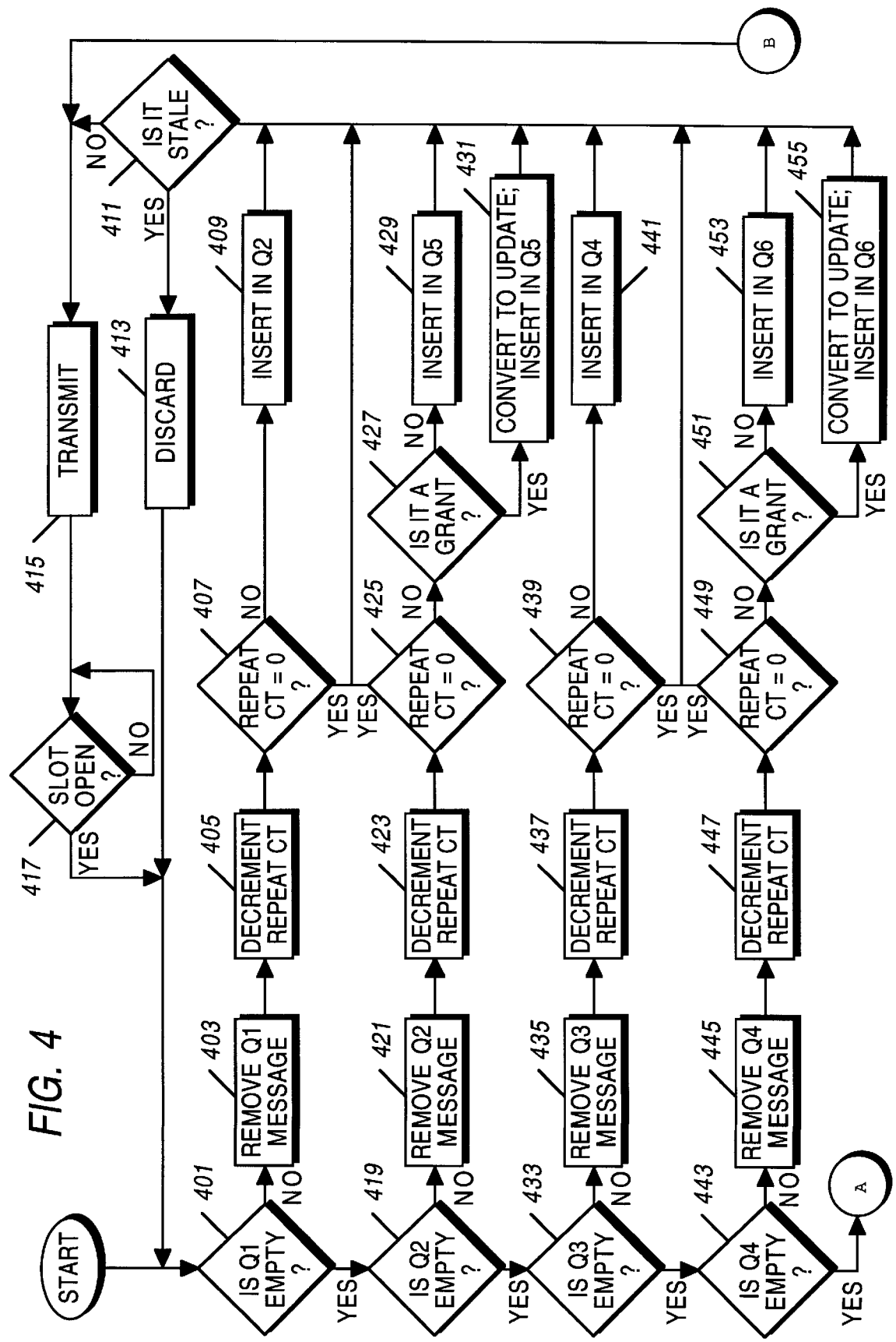
FIG. 4 and FIG. 5 comprise a flowchart showing a method of removing messages from the queue for transmission and reinserting them in the queue for retransmission in accordance with the invention.
Figure 5:
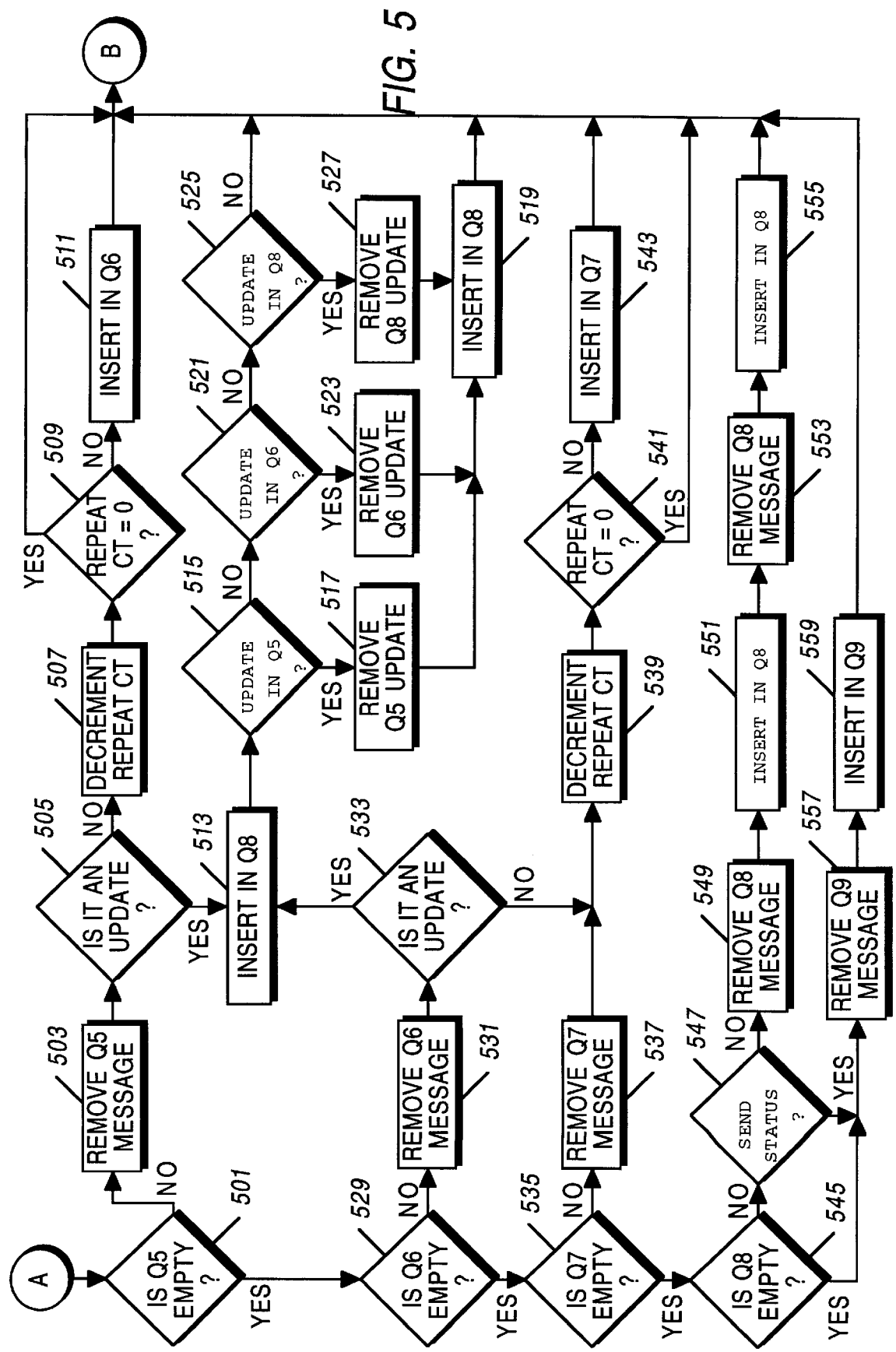

A method of selecting, or removing, messages from the queue 300 for transmission and reinserting them in the queue 300 for retransmission is shown in the flowchart of FIG. 4 and FIG. 5. If at step 401 queue #1 307 is not empty, the process continues with step 403 where a message is removed from queue #1 307 for transmission. At step 405, the repeat count for this message is decremented by one and the process continues with step 407. If at step 407 the repeat count equals zero the process continues with step 411 otherwise the process continues with step 409, where the message is inserted into queue #2 309. At step 411, it is determined if the message is stale, i.e., it is determined if the message may still serve any purpose by being transmitted. For example, if the transmit deadline message for the message has passed, the message would be considered stale because transmitting it would serve no useful purpose and would serve to waste bandwidth, hence the message would be discarded at 413 and the process would continue with step 401. If the message is not stale at step 411, the message that was removed from the queue 300 is transmitted at step 415, and the process continues with step 417. At step 417, when a slot is available for transmission, the process continues with step 401, otherwise the process continues with step 417.

If at step 401 queue #1 307 is empty, the process continues with step 419, where it is determined if queue #2 309 is empty. If queue #2 309 is not empty, the process continues with step 421, where a message is removed from queue #2 309 for transmission. At step 423, the repeat count for the message is decremented, and at step 425, if the repeat count is zero, the process continues with step 411, otherwise the process continues with step 427. If at step 427 the message is not a grant, the message is inserted into queue #5 321 at step 429. If the message is a grant at step 427, the message is converted into an update at step 431 and is also inserted into queue #5 321, and the process continues with step 411. A description of how a message is converted into an update is found with respect to process block 319 of FIG. 3. If at step 419, queue #2 309 is empty, the process continues with step 433, where it is determined if queue #3 315 is empty. If queue #3 315 is not empty, a message is removed from queue #3 315 for transmission at step 435. The repeat count for this message is decremented at step 437, and if the repeat count equals zero at step 439, the process continues with step 411, otherwise the process continues with step 441, where the message is inserted into queue #4 317. If at step 433, queue #3 315 is empty, the process continues with step 443, where it is determined if queue #4 317 is empty. If queue #4 317 is not empty, a message is removed from queue #4 317 at step 445 for transmission, the repeat count for this message is decremented by one at step 447, and at step 449, it is determined if the repeat count for this message is zero. If the repeat count is zero, the process continues with step 411, otherwise the process continues with step 451, where it is determined if the message is a grant. Step 451 is similar to step 427. If the message is not a grant at step 451, the message is inserted in queue #6 325 at step 453. If the message is a grant at step 451, the grant is converted to an update, as described with respect to process block 319 of FIG. 3, the message is inserted into queue #6 325, and the process continues with step 411.

If at step 443, queue #4 317 is empty, the process continues with step 501 of FIG. 5. If queue #5 321 is not empty at step 501, the process continues with step 503, where a message is removed from queue #5 321 for transmission at step 503. If at step 505, the message is an update, the process continues with step 513, otherwise the process continues with step 507. At step 507, the repeat count is decremented, and at step 509, if the repeat count equals zero, the process continues with step 415 of FIG. 4, otherwise the process continues with step 511, where the message is inserted into queue #6 325, and the process continues with step 415 of FIG. 4. If the message is an update at step 505, the process continues with step 513, where the message is inserted into queue #8 337, and the process continues with step 515.

In the preferred embodiment, an update takes half the time/bandwidth to transmit as a regular message, and messages are transmitted in slots of fixed length. For efficient use of the control channel, in the preferred embodiment, two half-slot size messages are transmitted on one slot, thus when one half-slot message is queued, another half-slot message is searched for to fill in the other half slot. Such a message may be found in either queue #5 321, queue #6 325, or queue #8 337, thus these three queues will be searched to find a half-slot message. Steps 515, 517, 519, 521, 523, 525, and 527 include the search process for a half-slot message. At step 515, if there is an update available for transmission in queue #5 321, that update is removed and inserted in to queue #8 337 at step 519, and the process continues with step 415 of FIG. 4. If there is no update in queue #5 321 at step 515, then it is determined if there is an update in queue #6 325 at step 521. If there is an update in queue #6 325, the process continues with step 523 where an update is removed and placed for transmission at step 523, and the update from queue #6 325 is then inserted into queue #8 337 at step 519 and the process continues with step 415 of FIG. 4. If there is no update in queue #6 325 at step 521, the process continues with step 525 where it is determined if an update is available in queue #8 337. If there is an update available in queue #8 337, that update is removed for transmission at step 527 inserted into queue #8 337 at step 519, and the process continues with step 415 of FIG. 4. If there is no update in queue #8 337 at step 525, the process continues with step 415 of FIG. 4.

If at step 501 queue #5 321 is empty, the process continues with step 529, where it is determined if queue #6 325 is empty. If queue #6 325 is not empty, a message is removed from queue #6 325 for transmission at step 531, and the process continues with step 533. If at step 533 the message from queue #6 325 is an update, the process continues with step 513, otherwise the process continues with step 539. If at step 529, queue #6 325 is empty, the process continues with step 535, where it is determined if queue #7 335 is empty. If queue #7 335 is not empty, then a message is removed from queue #7 335 at step 537 for transmission, and the process continues with step 539. At step 539, the repeat count for the message is decremented, if at step 541 the repeat count equals zero, the process continues with step 415 of FIG. 4, otherwise if the repeat count is not zero then the message is inserted into queue #7 335 at step 543, and the process continues with step 415 of FIG. 4. If at step 535 queue #7 335 is empty, the process continues with step 545, where it is determined if queue #8 337 is empty.

If queue #8 337 is not empty, the process continues with step 547, and if queue #8 337 is empty the process continues with step 557, where messages from queue #9 339 are handled. If at step 547, it is desired to send a status message, the process continues with step 557. Messages are selected between queue #8 337 and queue #9 339 based on how many messages are in each queue and how often these messages need to be transmitted. If it is not desired to send a status at this time, the process continues with step 549, where a message is removed from queue #8 337 for transmission and inserted into queue #8 337 at step 551. Because in the preferred embodiment, messages in queue #8 are half-slot size messages, a second message is removed from queue #8 337 at step 553 for transmission in order to fill the slot and the message is inserted into queue #8 337 at step 555, thereby two half slot messages from queue #8 337 are passed on for transmission at step 415 of FIG. 4. If either queue #8 337 is empty at step 545 or there is a status message to be sent at 547 the process continues with step 557, or a message is removed from queue #9 339 for transmission, the messages inserted into queue #9 339 again at step 559, and the process continues with step 415 of FIG. 4, where the messages are then transmitted.

Although the preferred embodiment decrements to count the number of repeats, using an incremental counter until the number of repeats would serve the same purpose, or any other method of counting the number of times the message is repeated would also serve the same function. The flow chart of FIGS. 4 and 5 is used in conjunction with the flow chart of FIG. 3 with respect to references to the queue numbers, e.g., queue #1 refers to queue #1 307, queue #2 refers to queue #2 309, and so forth.

In the preferred embodiment, messages are transmitted in a single slot of a frame comprised of three slots. A feature of the preferred embodiment includes preventing a message and one of its repeats from being transmitted in the same frame. This feature is implemented in the removal steps 403, 421, 435, 445, 503, 517, 523, 527, 531, 537, 549, 553, and 557. The advantages of the queue structure may also be gained if messages are not transmitted in a frame or if messages are all one size or multiple different sizes.

By queuing messages based on priority rather than prior techniques, messages that are transmitted with time critical delivery are quickly queued and transmitted, and are not subject to being delayed by low priority messages simply because the low priority messages were placed into the queue earlier. Bandwidth is not wasted and important responses are not delayed, and as a result, there is less likelihood that reliability must be traded off for throughput. When the zone controller creates outbound messages for the control channel and sends them to the site where sequencing decisions are to be made, a site does not know the state of the system, and thus cannot make intelligent decisions on which messages should be sent at what time. By having the zone controller prioritize messages, more intelligent decisions lead to a flexible architecture that allows more complex functionality to be added, provides increased throughput to handle the elevated traffic loads that are expected, for example, for APCO-25 systems, and provide a variable amount of packet repeats so that message reliability can be both flexible and match real time requirements, as is provided by the present invention. The present invention also makes site design simpler, and provides a mechanism for determining the immediacy of outbound messages and communicating this information to the message sequencer for a communication site resulting in a system with maximized overall system performance, thereby supporting more traffic channels with each control channel. A variable number of packet repetitions allow message reliability to match real time requirements.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising the steps of:
    generating, by a call processor, a message for future transmission on at least one control channel at a communication site;
    setting a priority based on a transmit deadline for the message;
    establishing a message repeat count based on a target audience for the message;
    conveying the message, including the priority and the message repeat count, from the call processor to the communication site.

2. The method of claim 1, wherein the step of setting further comprises the steps of:
    when the message has a short transmit deadline, setting the priority as high;
    when the message has a long transmit deadline, setting the priority as low;
    when the message priority was not set as high and was not set as low, setting the priority as medium.

3. The method of claim 1, wherein the step of establishing further comprises the steps of:
    when the message is targeted to more than one communication device, establishing the message repeat count as high;
    when the message is targeted to only one communication unit, establishing the message repeat count as medium;
    when the message is not targeted to any communication unit, establishing the message repeat count as low.

4. A method comprising the steps of:
    receiving a first message, including a first priority and a first message repeat count;
    placing the first message in a queue at one of at least two entry points to the queue, wherein the placing is based on the first priority, and wherein each of the entry points corresponds to a different priority;
    selecting, for transmission, a second message having a highest priority within the queue, wherein the second message has a second priority, a second message repeat count, and a queue position;
    when the second message has not been transmitted a number of times equal to the second message repeat count, reinserting the second message into the queue at a place in the queue the same as or lower than the second message's queue position.

5. The method of claim 4, wherein the step of reinserting the second message comprises the step of selecting an insertion point not necessarily immediately below the second message's queue position.

6. The method of claim 4, wherein each message is transmitted in one of N slots in a frame, wherein the step of selecting further comprises the step of selecting a message other than the message from the top of the queue when the message from the top of the queue is the same as a message scheduled for transmission in the same frame, wherein N is an integer greater than 1.

7. The method of claim 4, wherein the queue is comprised of a high priority queue (HPQ) having a high priority entry point and a medium priority queue (MPQ) having a medium priority entry point; wherein messages in the MPQ are queued after all messages in the HPQ are queued; and wherein the step of reinserting comprises the step of when the second message's queue position was at the bottom of the HPQ, placing the message in the MPQ at a position below the medium priority entry point.

8. The method of claim 4, wherein the queue is comprised of a high priority queue (HPQ) having a high priority entry point; wherein the HPQ comprises a first sub-queue and a second sub-queue, and wherein a message having a high priority and a message repeat count of at least two is first placed in the first sub-queue at the high priority entry point, and the message is reinserted in the second sub-queue after transmission from the first sub-queue.

9. The method of claim 4, wherein the queue is comprised of a medium priority queue (MPQ) having a medium priority entry point; wherein the MPQ comprises a first sub-queue and a second sub-queue, and wherein a message having a medium priority and a message repeat count of at least two is placed in the first sub-queue at the medium priority entry point, and the message is reinserted in the second sub-queue after transmission from the first sub-queue.

10. The method of claim 4, wherein the queue is comprised of a high priority queue (HPQ) and a medium priority queue (MPQ) having a medium priority entry point; wherein the MPQ is comprised of an upper queue and a lower queue; wherein the medium priority entry point is in the upper queue; wherein messages in the lower queue are queued after all messages in the upper queue are queued; wherein messages with a previous queue position in the HPQ and messages with a previous queue position in the upper queue are reinserted in the lower queue after transmission.

11. The method of claim 10, further comprising the steps of converting at least some of the messages into messages that are transmitted using less bandwidth than is used to transmit a message.

12. The method of claim 10, further comprising the step of arbitrating the order in which messages are to be transmitted from the lower queue of the MPQ.

13. The method of claim 4, wherein the queue is comprised of a medium priority queue (MPQ) having a medium priority entry point and a low priority queue (LPQ) having a low priority entry point; wherein the LPQ is comprised of an upper queue and a lower queue; wherein the low priority entry point is in the upper queue; wherein messages in the lower queue are queued after all messages in the upper queue are queued; wherein messages with a previous queue position in the MPQ are reinserted in the lower queue after transmission.

14. The method of claim 13, further comprising the step of arbitrating the order in which messages are to be transmitted from the lower queue of the LPQ.

15. A message transmission queue comprising:

a high priority queue (HPQ) having a high priority entry point;

a medium priority queue (MPQ) having a medium priority entry point; wherein messages in the MPQ are queued after all messages in the HPQ are queued;

a low priority queue (LPQ) having a low priority entry point; wherein messages in the LPQ are queued after all messages in the MPQ are queued;

a sequencer, operably coupled to the HPQ, the MPQ, and the LPQ, arranged and constructed to reinsert messages into the queue based on a message repeat count and a position of the message in the queue prior to being reinserted.

16. The message transmission queue of claim 15, wherein the HPQ comprises a first sub-queue and a second sub-queue, and wherein a message having a high priority and a message repeat count of at least two is first placed in the first sub-queue at the high priority entry point, and the message is reinserted in the second sub-queue after transmission from the first sub-queue.

17. The message transmission queue of claim 15, wherein the MPQ comprises a first sub-queue and a second sub-queue, and wherein a message having a medium priority and a message repeat count of at least two is placed in the first sub-queue at the medium priority entry point, and the message is reinserted in the second sub-queue after transmission from the first sub-queue.

18. The message transmission queue of claim 15, wherein the MPQ is comprised of an upper queue and a lower queue; wherein the medium priority entry point is in the upper queue; wherein messages in the lower queue are queued after all messages in the upper queue are queued; wherein messages with a previous queue position in the HPQ and messages with a previous queue position in the upper queue are reinserted in the lower queue after transmission.

19. The message transmission queue of claim 18, wherein at least some of the messages in the lower queue are converted into messages that are transmitted using less bandwidth than is used to transmit the original message.

20. The message transmission queue of claim 18, wherein the MPQ further comprises an arbitrator that selects the order in which messages are to be transmitted from the lower queue.

21. The message transmission queue of claim 15, wherein the LPQ is comprised of an upper queue and a lower queue; wherein the low priority entry point is in the upper queue; wherein messages in the lower queue are queued after all messages in the upper queue are queued; wherein messages with a previous queue position in the MPQ are reinserted in the lower queue after transmission.

22. The message transmission queue of claim 21, wherein the LPQ further comprises an arbitrator that selects the order in which messages are to be transmitted from the lower queue.

* * * * *